J. PHELPS.
Fifth Wheel.
No. 59,642. Patented Nov. 13, 1866.
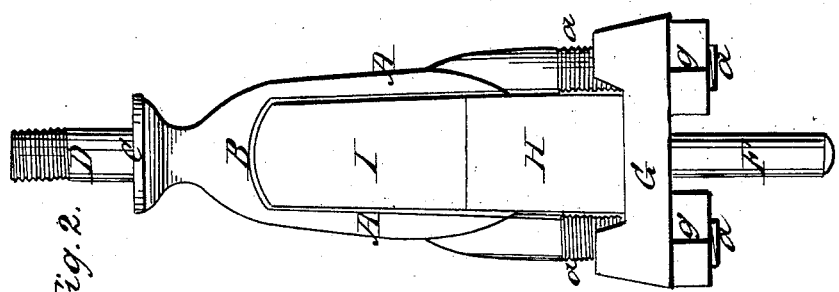
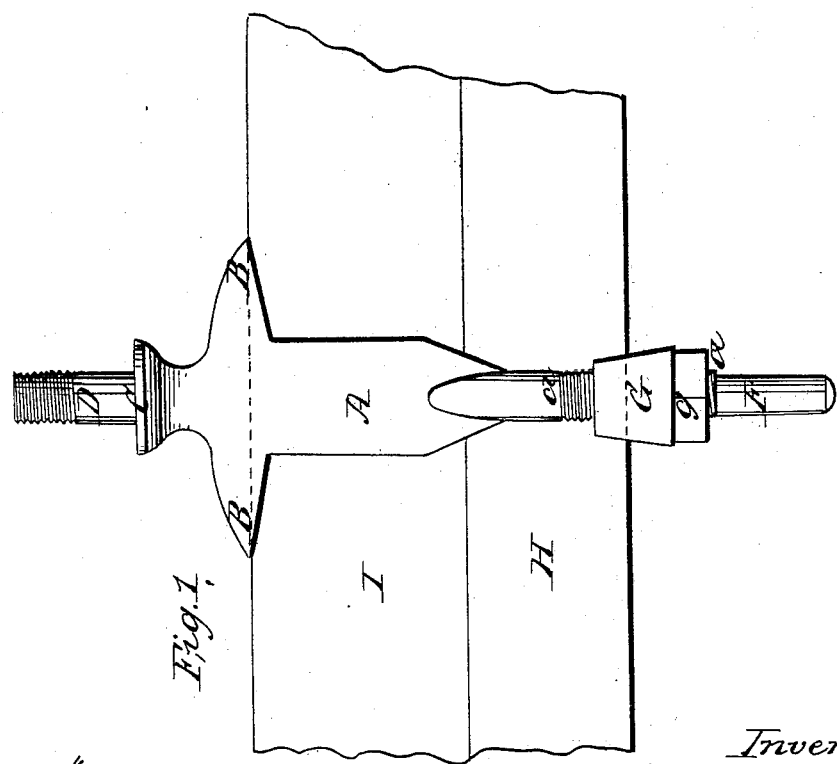
Witnesses:
E. J. Brown
S. Browne
Inventor:
James Phelps
By his atty
S. Browne

UNITED STATES PATENT OFFICE.

JAMES PHELPS, OF RED CREEK, NEW YORK, ASSIGNOR TO HIMSELF AND ISAAC F. MOSHER.

IMPROVEMENT IN KING-BOLTS FOR CARRIAGES.

Specification forming part of Letters Patent No. 59,642, dated November 13, 1866.

*To all whom it may concern:*

Be it known that I, JAMES PHELPS, of Red Creek, in the county of Wayne and State of New York, have invented an Improved King-Bolt for Carriages; and I do hereby declare that the following is a full and exact description thereof, reference being had to the accompanying drawings, making part of this specification—

Figure 1 being a front-side view of the king-bolt; Fig. 2, a side view thereof at right angles to the view in Fig. 1.

Like letters designate corresponding parts in both figures.

Instead of passing the shank of the king-bolt through the front axle of the carriage in the usual manner, I make two shanks, A A, which embrace the axle H and its bed or bolster piece I. The shanks terminate with screws $a\ a$, upon which nuts $g\ g$ are screwed, and tighten a cross-clasp, G, up against the axle, and thus firmly secure the bolt to the axle. This method of making the king-bolt and attaching it to the axle renders the axle much stronger than if perforated to receive the bolt. The king-bolt is also much more easily and cheaply made, using malleable iron.

An important feature of this construction is the extended bearings or shoulders B B, which rest upon the axle or bed-piece I, which steadies and strengthens the bolt, and prevents the king-bolt from wearing into the wood, as it would without this.

The top D of the king-bolt passes up through the reach-iron or perch-plate, and is held by a nut screwed upon it between the perch-plate and head-block, thus avoiding the rock of the head-block and spring. It has a shoulder, $c$, for the weight of the carriage to rest on, thus taking it in a great measure from the circles and obviating much of the wear thereof.

What I claim as my invention, and desire to secure by Letters Patent, is—

The projecting shoulders or bearings B B, resting on the axle at the fork of the king-bolt, for the purpose herein specified.

The above specification of my improved king-bolt for carriages signed by me this 18th day of September, 1865.

JAMES PHELPS.

Witnesses:
ISAAC F. MOSHER,
J. D. COVERT.